United States Patent
Ho et al.

(10) Patent No.: US 7,084,867 B1
(45) Date of Patent: Aug. 1, 2006

(54) HAPTIC INTERFACE SYSTEM FOR COLLISION DETECTION AND APPLICATIONS THEREFORE

(75) Inventors: Stephen S. Ho, Cambridge, MA (US); Sanjay Sarma, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/542,942

(22) Filed: Mar. 31, 2000

Related U.S. Application Data (60) Provisional application No. 60/127,655, filed on Apr. 2, 1999.

(51) Int. Cl.
*G06T 15/00* (2006.01)

(52) U.S. Cl. .................. 345/419; 345/420; 463/31
(58) Field of Classification Search ................ 345/156, 345/157, 162, 419, 420, 440, 441, 427, 958, 345/952; 703/17, 21, 22; 250/559.3; 901/9; 700/182; 463/31
See application file for complete search history.

(56) References Cited

U.S. PATENT DOCUMENTS

| | | | |
|---|---|---|---|
| 3,919,691 A | 11/1975 | Noll | |
| 5,736,978 A * | 4/1998 | Hasser et al. | 345/173 |
| 5,768,565 A * | 6/1998 | Matsuda et al. | 703/6 |
| 5,800,177 A * | 9/1998 | Gillio | 434/262 |
| 5,844,392 A | 12/1998 | Peurach et al. | |
| 5,923,318 A * | 7/1999 | Zhai et al. | 345/157 |
| 6,113,395 A * | 9/2000 | Hon | 434/262 |
| 6,278,439 B1 * | 8/2001 | Rosenberg et al. | 345/157 |
| 6,292,170 B1 * | 9/2001 | Chang et al. | 345/156 |
| 6,404,913 B1 * | 6/2002 | Ohki | 382/154 |
| 6,407,748 B1 * | 6/2002 | Xavier | 345/672 |
| 6,421,048 B1 * | 7/2002 | Shih et al. | 345/419 |
| 6,704,694 B1 * | 3/2004 | Basdogan et al. | 703/4 |

OTHER PUBLICATIONS

Paul Jerome Killpatrick, The use of Kinesthetic Supplement in an Interactive Graphic system, Feb. 17, 1977, University of North carolina.*

* cited by examiner

*Primary Examiner*—Richard Hjerpe
*Assistant Examiner*—Abbas Abdulselam
(74) *Attorney, Agent, or Firm*—Wolf, Greenfield & Sacks, P.C.

(57) ABSTRACT

A method and system are provided for controlling the simulated interfacing of a controlled first body, for example a tool, with a second body while providing haptic feedback to a user on such interfacing. Selected representations of the first and second bodies are stored in a memory of a processing apparatus and are used by such apparatus to control simulated movement of the first body relative to the second body in response to a user controlled haptic interface device. Collisions between the first and second body are detected, including the position on each body of each collision, the direction of the collision and the force of the collision, and this information is converted for each collision into a force vector on the first body which is fed back as a corresponding force vector to the interface device, and thus to the user. A feature of the invention is storing a point cloud representation of at least one of the bodies, which point cloud representation is utilized in the simulations. The representations may also be an implicit equation representation, a binary space tree partition representation or the like. A niceness factor may also be utilized in determining force feedback as may a guide zone around at least a portion of one of the bodies which, for example, may be utilized to provide a snap-fit. Other features are also provided.

33 Claims, 4 Drawing Sheets

AXIALLY SYMMETRIC TOOL REPRESENTED BY TWO VARIABLE EQUATION

FIG. 5A

REGIONS OF THE AXIALLY SYMMETRIC TOOL

FIG. 5B

REGIONS OF THE AXIALLY SYMMETRIC TOOL.

FIG. 5C

HAPTIC INTERFACE SYSTEM FOR COLLISION DETECTION AND APPLICATIONS THEREFORE

This applications claims the benefit of Provisional Application No. 60/127,655, filed Apr. 2, 1999.

GOVERNMENT SUPPORT

This invention was made with government support under Grant No. N00014-95-1-G039 awarded by the Department of the Navy. The government has certain rights in the invention.

FIELD OF THE INVENTION

This invention relates to haptic interface systems and more particularly to a system which permits a user to obtain tactile feedback of position, direction and force, preferably in at least five degrees of freedom, for contacts/collisions between two bodies, to various enhanced feedback features for such systems and to CAD/CAM and other applications thereof.

BACKGROUND OF THE INVENTION

Tactile interfaces are used in a variety of applications to enable a user operating a joy-stick like or other control device to both control movement of a point, line or solid body in at least two degrees of freedom and to provide tactile feedback to the user through the device when the guided or controlled point or body, which is generally computer simulated and displayed on a computer monitor, collides or otherwise interfaces with another surface or body. Such feedback systems can be used in a variety of applications, generally "virtually reality" applications, including generation of tool paths for various computer assisted design/computer assisted machining (CAD/CAM) applications, including computer numerically controlled (CNC) procedures, including milling, and other fabrication procedures. Such interfaces may also be utilized for graphical design and to simulate an environment for training purposes, for example to train doctors, dentists and other medical and paramedical professionals, machine operators and the like, as a controller in a variety of computer video games and in other research, industrial, medical, military and recreational applications where touch or feel is used to explore, to interface with or to act on a simulated environment. The simulated environment may be a real environment, for example a realsolid body (or bodies), which is stored in a selected digital format in the computer, or the simulated environment being interfaced with may be an unknown environment which is randomly or arbitrarily generated for training or other purposes.

Existing haptic interfaces have been limited in that most have been capable of operating in only a limited number of degrees of freedom, rather than providing full five or six degrees of freedom capability and, more particularly, for interfaces capable of operating in multiple degrees of freedom, have been capable of providing only point contact with a body, not real full-body contact between bodies which have complex geometries. Thus, with such interfaces, it is not possible to simulate many real world environments.

Another factor which is particularly useful in CAD/CAM and in training applications is for the user not only to be able to feel what they are doing, maintaining desired contacts while avoiding undesired collisions, but also to be prompted to maintain the tool or other guided/controlled body in a proper orientation with proper portions of the bodies in contact and to receive tactile feedback through the haptic interface tool when the user deviates from one or more of the desired factors. The same can be true for the force applied when two bodies are brought together, for example when a drill is brought in contact with a surface to be drilled. The force applied to the tool can influence things such as heating of the contacting bodies as a result of friction, depth of cut, torque on the drill and time to complete the job. Too much force or too little force can adversely affect one or more of these factors, and it is therefore desirable that the user be able to feel when a proper force is being applied. It is therefore desirable that a computer controlled haptic interface also provide feedback to a user through the interface device to indicate when the user is at a proper orientation, when proper points of the bodies are in contact and/or when an appropriate force is being applied and to provide feedback to the user when the user deviates from the desired factors. This feedback force can increase gradually with increased deviation from the desired factors or the system can provide a "snap-fit," which provides a force to pull the bodies into a desired contact when they are within a selected distance of each other and resists movement which would take the bodies out of contact. The feedback force could also be tailored to simulate other events/conditions for a selected application.

Finally, it is generally required that haptic feedback systems provide real time performance; for example sampling and responding at 1000 Hz, even with the enhanced features indicated above. Haptic interface systems providing most of the capabilities indicated above do not currently exist in the art, and there is certainly nothing providing the indicated functions while still operating in real time.

SUMMARY OF THE INVENTION

In accordance with the above, this invention provides a method and system for controlling the simulated interfacing of a first body controlled by a user with a second body, while providing haptic feedback to the user concerning the interfacing. Selected representations of the first body and the second body are stored in at least one memory of a computer. A user controlled haptic interface device is also provided, which device is utilized to control simulated movement of the first body relative to the second body. Collisions between the first and second bodies are also detected, such detection including the position on each body of each collision, the direction of the collision and the force for the collision. The detected direction, point and force for each collision are converted into at least one force vector on the first body, which at least one force vector is applied as a corresponding feedback force vector to the interface device, and thus to the user. Processing apparatus is provided for performing various ones of the above functions, including providing the simulated movement, detecting collisions, converting information from the collisions into the at least one force vector and feeding back the at least one force vector to the interface device.

For preferred embodiments, the interface device controls simulated movement of the first body in at least five degrees of freedom and the at least one force vector is in the same at least five degrees of freedom. Various types of representations may be used for the first and second bodies, one of the representations for example being an implicit equation representation of the body. For one embodiment, the first body, the body controlled by the user, is represented as a binary space partition tree. For this embodiment, force for a collision is represented at least in part by penetration of the body represented by the implicit equation into the other body. For some embodiments, at least one of the representations is a point cloud representation of the body. A niceness factor may also be stored for at least one feature of the first body and utilized to influence the force vector. A guide zone may also be defined around at least a portion of one of the bodies and a force feedback provided to the interface device to urge the first body toward the second body when the bodies are not in contact, but the guide zone of the one body is detected as having the other body therein.

In another aspect, the invention includes a method and/or system for controlling the simulated interfacing of a first body controlled by a user with a second body, while providing haptic feedback to the user on such interfacing, which includes storing a point cloud representation of at least one of the bodies and utilizing the point cloud representation, preferably by use of a processing apparatus, in the simulation.

In still another aspect of the invention, a method for generating CAD/CAM postures for a tool operating on a body is provided. The method includes storing a representation of the tool and a representation of the body in a computer; using a user controlled haptic interface device to control simulated movement of the tool relative to the body; detecting any collision between the tool and the body for a given posture, including the position on each for each collision, the direction of the collision, and the penetration of the tool into the body; converting the detected direction, point and penetration for each collision into at least one force vector on the tool, summing the force vectors for a given posture; applying the at least one force vector as a corresponding feedback force vector to the interface device, and thus to the user; and storing postures of the tool when the tool collides with the body at a working surface of the tool, but does not otherwise collide with the tool as potential CAD/CAM postured.

The method may also include determining potential CAD/CAM postures which at least meet selected criteria and storing only such postures or storing only the best posture for each point on the body. The representation of the tool may include a niceness factor, the niceness factor being higher for regions of the tool where contact is desired, and decreasing for regions as a function of desired contact in such regions. For preferred embodiments, the niceness factor is zero for regions where contact is undesirable. The niceness factor for a posture is the lowest niceness factor for contacts occurring at such posture. For preferred embodiments, the tool representation is divided into regions, a different region being defined at least at each surface transition of the tool. Where niceness factors are employed, a niceness factor may be assigned to each region. Force direction and magnitude is preferably continuous within each of the tool regions. The tool representation may be a binary space partition tree representation, which representation is stored for each region. A point cloud representation may be stored as a representation of the body. A snap-fit region for the tool may also be defined around each working, desired contact region thereof. Where snap-fit regions are defined, a force may be applied to the interface device to urge the tool toward the body when the body and the tool are not in contact, but the body is in a snap-fit region of the tool.

Where a part is being machined from the body and material is being removed from the body in layers, constraints may be established at layer boundaries and collisions detected between the tool and a selected operative constraint. The constraints may be stored as implicit equation representations, while the tool is stored as a point cloud representation. Where constraints are established, collisions are detected both between the tool and the part and between the tool and the operative constraint. Force vectors are generated for each collision and are summed and averaged to determine force vectors for all collisions. A desired orientation may also be defined for the tool and a suitable force applied to the haptic device to urge the device in a direction to curb any deviation of tool orientation from desired orientation.

The foregoing and other objects, features and advantages of the invention will be =apparent from the following more particular description of preferred embodiments of the invention as illustrated in the accompanying drawings, like reference numerals being used in the various drawings for common elements.

DETAILED DESCRIPTION

While the haptic interface system of this invention may be used in a wide variety of virtual reality applications, many of which have been previously indicated, since the currently preferred application for the system is for generating tool postures, and in particular for producing a tool posture map for CAD/CAM applications, the following discussion of illustrative embodiments will be with respect to such an application. However, it should be understood that this is not intended as a limitation on the invention and that the invention is by no means limited to this application.

Figure 1:
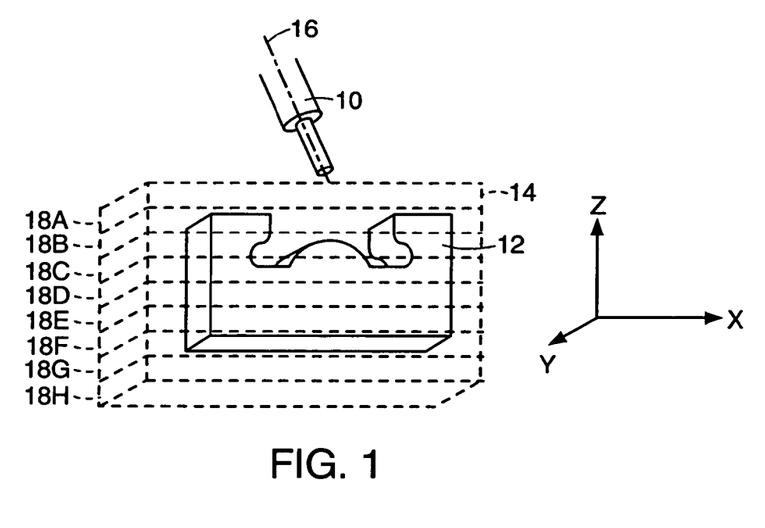
FIG. 1 is a diagrammatic representation of an illustrative tool and body on which the teachings of this invention may be utilized.

For purposes of the following discussion, it will be assumed that, referring to FIG. 1, a tool 10, which for preferred embodiments is assumed to be an axially symmetric tool, is being used to fabricate a particular part 12, which may be of random and complicated shape, from a solid body, in this case a block 14 shown in dotted line form around part 12. The assumption of axial symmetry for tool 10 is a valid assumption for most tools used in CAD/CAM applications, which machining tools include milling bits, grinding wheels and the like, which are rotated about their center axis 16. In some instances, either in addition to or instead of tool 10 being rotated, body 14 may be rotated or otherwise moved with respect to the tool. However, as will be discussed later, the assumption of axial symmetry, while simplifying computations, is not an essential limitation on the invention. Since the amount of material removed by a tool in a single pass is generally limited, unwanted portions of body 14 are typically removed in layers as shown in FIG. 1. A manner of facilitating the generation of tool paths for each of the layers 18A–18H will be described in greater detail later.

In the following discussion, the word "tool posture" will be used to refer to both the x-y-z position of tool 10 and its orientation relative to the x-y plane. In determining postures which are at least acceptable, and preferably the most acceptable posture, for a given x-y-z position, a determination needs to be made as to tool contact with the body or part on a desired surface of the tool and the absence of contact of the tool with the body/part on any other surface. Posture may also have a force component of restriction which assures, for example, that penetration of tool 10 into body 14 is only to the bottom of the layer 18 being operated on and not to a deeper depth. To the extent contact is being made between tool 10 and part 12, the contact should be only sufficient for contact with such surface, and normally not sufficient to penetrate deeply into the surface. Techniques for achieving these objectives are discussed hereinafter.

Figure 2:
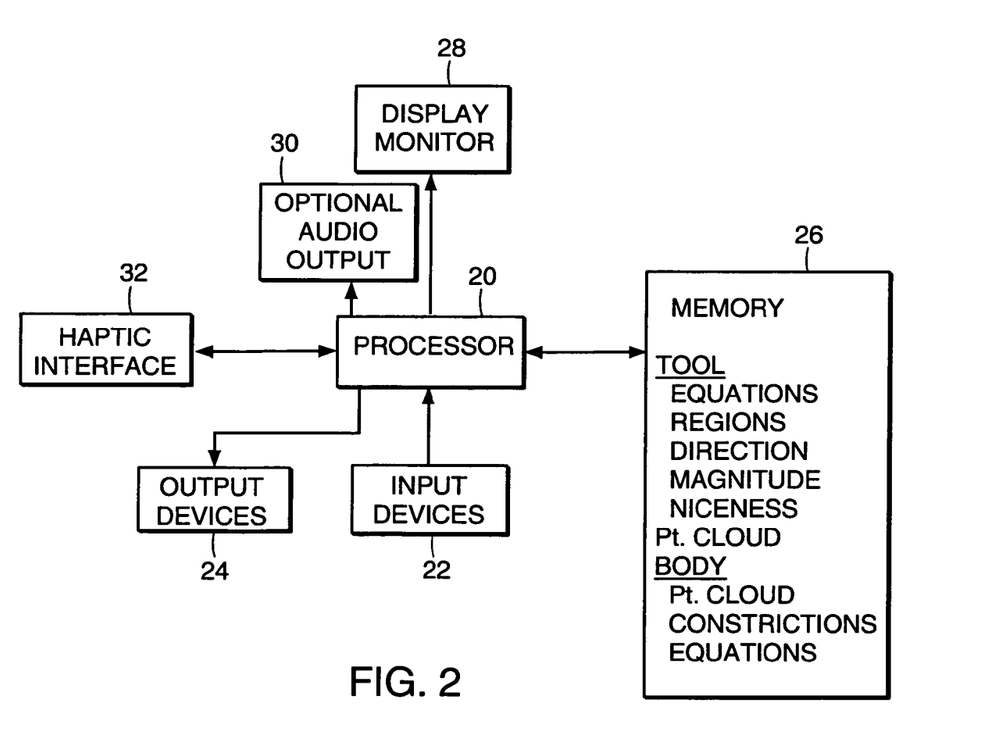
FIG. 2 is a schematic block diagram of an illustrative system for practicing the teachings of this invention.

Referring now to FIG. 2, a system which may be utilized in practicing the teachings of this invention might include a central processor 20, which may be a processor dedicated to performing the functions of this invention, or might be a larger processor programmed to perform the functions of this invention in addition to other functions. While it is currently contemplated that processor 20 is a programmed general purpose processor, for example a work station or P.C., in some applications, processor 20 might be a special purpose hardware device or a hybrid device including both special purpose hardware and a general purpose programmed processor. Processor 20 may have a keyboard, mouse, various disk drives or other suitable input devices 22 for loading data therein, one or more standard output devices 24 such as a printer or disk drive for permitting the outputting of preferred tool position data which has been accumulated, a memory 26 for storing various information on tool 10, part 12, body 14, etc. and for storing postures and other generated data, all of which information will be discussed in greater detail later, a display monitor 28 to permit a user to observe the relative position of a virtual tool and virtual body/part and their interaction, an optional audio output 30 which may, for example alert the user to undesired collisions, and a haptic interface 32 which communicates bidirectionally with processor 20. Haptic interface 32 may include both a special purpose controller and a manual device movable in three to six degrees of freedom, and preferably in at least five degrees of freedom, the movements of which and instantaneous positions of which are transmitted to processor 20. Processor 20 in turn provides feedback signals to the haptic interface so that the user can "feel" what he is doing. Examples of haptic interfaces suitable for use as the haptic interface 32 include the interfaces shown and described in U.S. Pat. Nos. 5,625,576 and 5,587,937. A suitable interface is also discussed in "Pen-Based Haptic Virtual Environment," Proceedings of IEEE Virtual Reality Annual International Symposium (Sep. 18–22 1993, Seattle, Wash.) pp. 287–292. The interface may, for example, be a pen-like device or a lever-like device movable with at least three, and preferably at least five, degrees of freedom, for example in all directions except rotation about the z axis, with suitable linkages connected to the movable hand-held device (hereinafter the device), and both sensors and servomotors at the linkages, so that the instantaneous position of the device in all degrees of freedom may be determined and the processor may send appropriate force feedback to the servomotors or other drive elements to provide the desired haptic feedback to the user.

Figure 3:
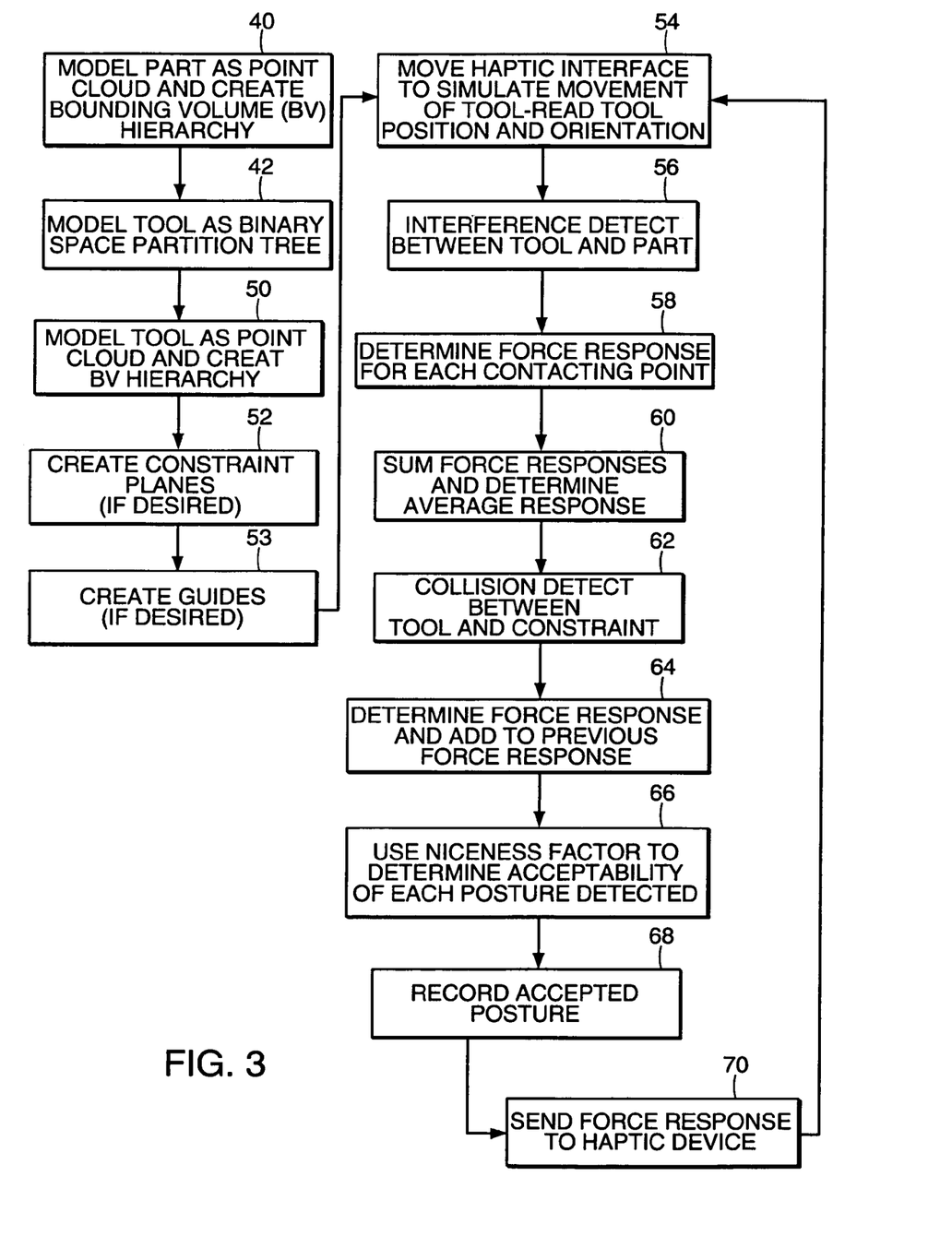
FIG. 3 is a block diagram of a method of generating a posture map in accordance with the teachings of this invention.

Referring to FIG. 3, which is a generalized block diagram of the process for generating a posture map in accordance with the teachings of this invention, it is seen that the first step in the operation, step 40, is to generate and store a point cloud representation of the part 12. While more generally, all that is required for step 40 is to generate a representation of part 12 in some usable form, for reasons to be discussed shortly, a point cloud representation is considered advantageous. However, tesselated or triangulated surface models, which are well understood in the CAD/CAM art, may also be used for representing the surface of part 12, the surface could be represented using NURBS (non-uniform rational B-splines) or the surface could be represented in other ways. A standard format for a triangulated model is called STL (stereo lithography). A point cloud representation is generated by creating a triangulated representation of the surface of part 12 in ways known in the art and then storing both the vertices of the triangles of the representation as well as a substantially uniform distribution of additional points to form the point cloud. A number of known random point generation algorithms could be utilized for generating the additional points of the point cloud representation. For an illustrative embodiment, the random point selection procedure is based on an algorithm: "Generating Random Points in Triangles," by Greg Turk, "Graphics Gems", Academic Press, 1990. In generating and storing information for the point cloud representation, information is also retained in memory which allows a determination as to the triangle in a triangulated surface model which each point of the point cloud is located in. For reasons to be discussed later, information is also stored for the creation of a bounding volume (BV) hierarchy.

The next step in the operation, step 42, is to model and store tool 10 as a binary space partition tree utilizing implicit equation representations. However, while an binary space partition tree representation is indicated in FIG. 3 for the preferred embodiment, a triangulated, point cloud or other suitable representation could be used for tool 10, and in fact is used in some situations; however, for reasons to be discussed later, the explicit equation representation is considered preferable for the preferred embodiment for collision detection with part 12.

To understand how tool 10 may be represented, reference is made to FIGS. 4 and 5A–5C. In conjunction with these figures, it will be initially assumed that the tool is axially symmetric, since exploitation of this assumption significantly simplifies calculations. In particular, this permits the converting of x and y coordinates to a radial distance d, where $d=\sqrt{x^2+y^2}$. This permits the boundary of the tool to be defined by a piece-wise continuous two variable function. For example, the tool shown in FIG. 5A could be defined $$\left\{\begin{array}{c} d-5 \leq 0, \text{ when } 0 \leq z < 11 \\ d-3 \leq 0, \text{ when } 11 \leq z < 13 \\ d+z-16 \leq 0, \text{ when } 13 \leq z < 15 \\ d \leq 0, \text{ when } 15 \leq z < 19 \\ d^2+(z-19)^2-1 \leq 0, \text{ when } 19 \leq z < 20 \end{array}\right\}$$

by the piece-wise continuous functions:

However, the goal of the interpenetration analysis is to determine the proper force response for a given point penetration of the point cloud into the tool. Since the part object 12 is represented by a point cloud, the force response between the part object and the tool object is the summation of the force response of each point of the point cloud. Since non-penetrating points contribute zero force response; the total force response is the sum of force responses of the penetrating points. However, for purposes of interpenetration analysis, more information describing the tool and how the tool should react to point collisions must be provided. For example, the magnitude and direction of the reaction force is needed to provide haptic response. To facilitate the definition of these quantities in the tool definition, step 44 (FIG. 4) is performed to divide the tool into regions. Within each region, the force response direction and magnitude are defined for preferred embodiments by explicit functions, an explicit function being of the form $f(d, z)=a_0 d^2+a_1 d+a_2 z^2+a_3 z+C$ where $a_0, a_1, a_2, a_3$ and C are constants. The equations may be quadric equations, but may also be other functions (i.e. cubic, cross-terms, exponential, etc.).

Figure 5A:
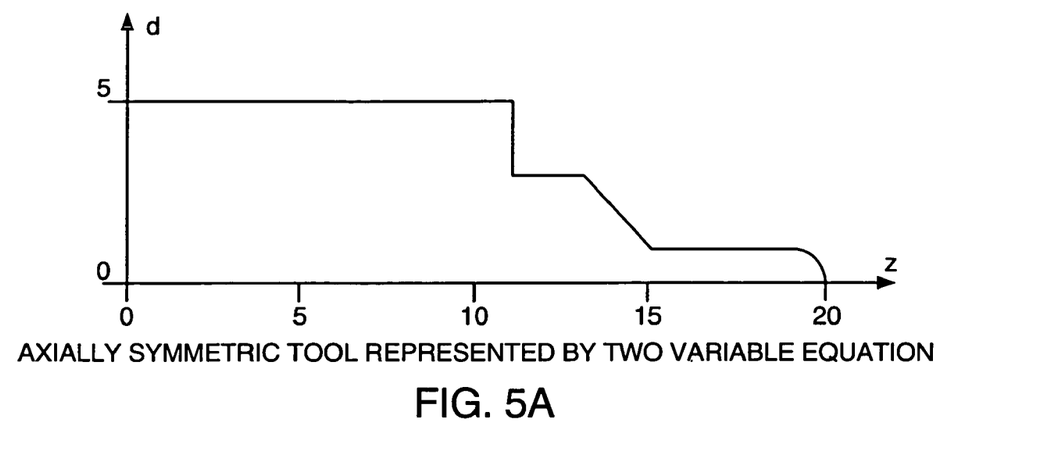
FIGS. 5A, 5B and 5C are representations of an illustrative tool, a regionalization of the illustrative tool and a regionalization of the illustrative tool with an additional snap fit region respectively.
Figure 5B:
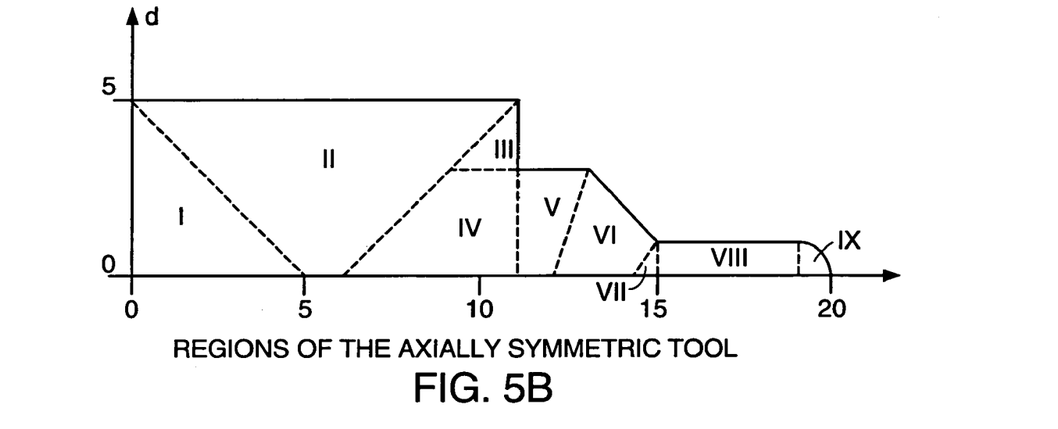

FIG. 5B illustrates one way in which the exemplary tool shown in FIG. 5A may be divided into regions. While there are no firm criteria for the regionalization process, generally a new region will be defined at each transition for the tool surface. It is also important that the force response be continuous within a region, but discontinuities are acceptable at the region boundaries. Further, the functions that describe the force response direction and magnitude for each region should be designed so that the force response penalizes deeper penetration with a larger force response magnitude and the direction of force response compels repulsion between the point and the solid interior. Therefore, the magnitude corresponds to penetration depth and should be zero at the surface of the solid, positive in the interior of the tool and negative in the exterior of the tool. The direction should be that to the nearest exterior point from the given point at the surface of each region. This direction is normal at the surface. In accordance with the above criteria, there may be several ways to regionalize a given tool 10 and the particular regionalization of the tool which best meets these criteria may ultimately to be empirically determined.

Figure 4:
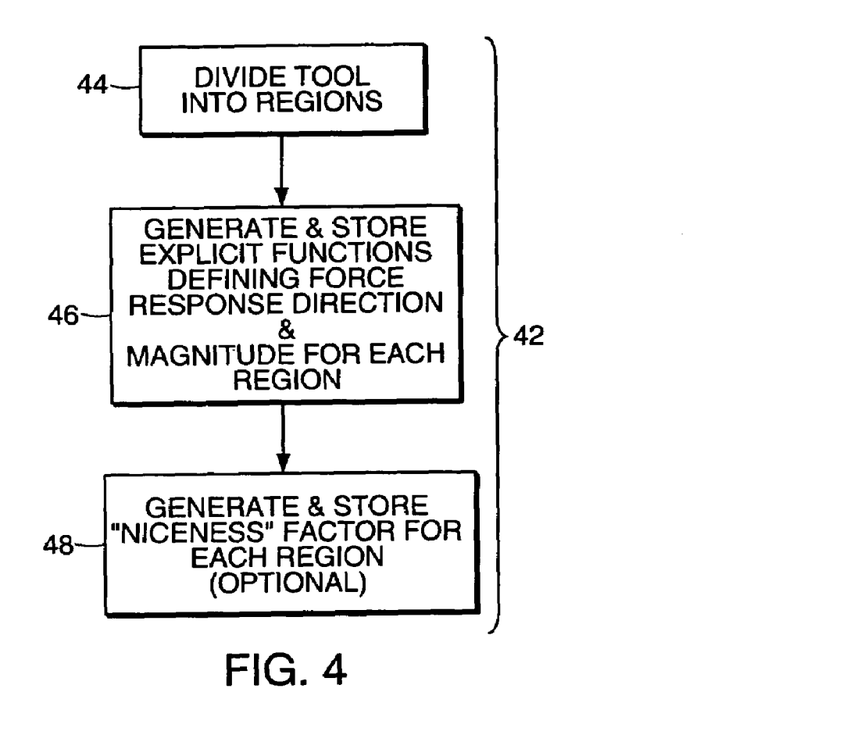
FIG. 4 is a block diagram of the steps involved in performing the generation and storage of binary space partition tree representation of the tool.

In performing step 46 to generate explicit functions defining the force response direction and magnitude for each region, the criteria above will need to be borne in mind. For example, the proper force direction for a plane is the outward normal of the plane. The $$d = \frac{Ax_1 + By_1 + Cz_1 + D}{\sqrt{a^2 + B^2 + C^2}}$$

penetration depth of a point $(x_1+y_1+z_1)$ relative to a plane $Ax+By+Cz+d=0$ is The force magnitude should increase with increasing penetration depth; therefore a magnitude function such as $m=kd^n$, where k is a constant and $n \geq 1$ is an example of a possible force response magnitude function for a plane.

Where symmetry of the tool is not assumed so that x and y must be considered, the equations become slightly more complex. However, the goal of maintaining a force direction that compels the point out of the interior remains the same. What is different is the fact that the direction depends on the location of the point within the sphere or other body. For the unit sphere located at the origin defined by the equation $x^2+y^2+z^2-1=0$, the $$\left[\frac{x_1}{\sqrt{x_1^2+y_1^2+z_1^2}}\right]$$

direction of force for a point $(x_1, y_1, z_1)$ that is penetrating the sphere is the vector This vector is the unit vector in the same direction as the ray originating at the center of the sphere passing through the point $(x_1, y_1, z_1)$.

The actual force response functions defined for each region of the tool depends on the tool geometry. The force direction response function should describe a vector field within the region whose direction indicates a direct path out of the interior of the solid. At the surface of the tool, this direction response should be normal to the tool surface. The force response magnitude should be some measure that is greater at deeper penetrations. Distance is a good measure. Measuring the distance between the penetrating point and the surface of the tool along the direction of the force response direction is usually sufficient.

For the regions shown in FIG. 5B, the direction of force response for regions I and III are defined by a constant direction. The direction of force for the remaining regions

I. $[00-1]$

II. $\left[\frac{x}{\sqrt{x^2+y^2}}\right]$

III. $[001]$

IV. $\left[\frac{x}{\sqrt{2(x^2+y^2)}}\right]$

V. $\left[\frac{x}{\sqrt{x^2+y^2}}\right]$

VI. $\left[\frac{x}{\sqrt{2(x^2+y^2)}}\right]$

VII. $\left[2\frac{x}{\sqrt{3(x^2+y^2)}}\right]$

VIII. $\left[\frac{x}{\sqrt{(x^2+y^2)}}\right]$ $$IX. \left[ \frac{x}{\sqrt{x^2+y^2+(z-19)^2}} \right]$$

depends on the location of the point within the region and are given by:

These directions in each instance are selected so as to provide the shortest distance from the point to a surface of the tool. While these equations will be different for a different tool, or for the same tool divided into different regions, the equations for the direction of force response for each region can be generated in each instance for the tool by selecting the region such that a force direction for shortest exit from each point can be represented by the simplest function. Because contact is not axially symmetric, (i.e., contact generally is made on one side of the tool), the determination of force direction must consider x, y information in addition to z information.

I. $z$
II. $5-\sqrt{x^2+y^2}$
III. $11-z$
IV. $14-\sqrt{x^2+y^2}-z$
V. $3-\sqrt{x^2+y^2}$
VI. $16-\sqrt{x^2+y^2}-z$
VII. $17-2\sqrt{x^2+y^2}-z$
VIII. $1-\sqrt{x^2+y^2}$
IX. $1-\sqrt{x^2+y^2+(z-19)^2}$ For the force magnitude, the functions for each of the regions in FIG. 5B are:

In this case, the magnitudes are a direct function of increasing depth, it being remembered that the $\sqrt{x^2+y^2}=d$ for a particular point on the solid tool. Thus, for any point in region II, the force is equal to the difference between 5 and the distance of the point from the center axis, or in other words directly proportional to the distance of penetration. This is true for the other regions as well. Depending on the criteria used for increased magnitude with depth of penetration, a force response equation can be produced for each region for any tool and regionalization thereof.

Step 48 of FIG. 4 illustrates one additional value which may be stored for each region, namely a "niceness" factor. Niceness is a measurement of the acceptability and desirability of contact at a particular point along a tool surface. If contact occurs such that a non-cutting surface of the tool contacts the part 12 or body 14, then such contact is not acceptable and the niceness value for such contact would be very low, for example 0. If certain regions of the cutting surface are more desirable than others, then higher niceness values are associated with these more desirable surfaces. For example, for a turning tool such as a grinding tip or drill, contact at the center of the tip is not as desirable as contact at the edge of the tip since the cutting surface is moving faster at the edges of the tip. Further, very deep penetration into a cutting surface is also less desirable; therefore, niceness decreases with higher penetration depth. Niceness factor may be defined by an equation for each region, which equation is defined and determined in substantially the same way as the force and magnitude equations previously discussed (i.e., equations 4 and 5).

If the tool surface of the region is a non-cutting surface, then the associated function for niceness is generally 0. If the tool surface of the region is a cutting surface, then the associated function is a positive value. As indicated above, this positive value decreases for increasing penetration depth. Where there are multiple points of penetration, the niceness factor assigned to the posture will be the lowest niceness factor of the factors for the contact points. Thus, if contact is made at three points for a given posture, and the niceness factors for the three points are 1.2, 0.7, and 0, the niceness factor for the posture will be 0, indicating this as an unacceptable posture. The following equations 6 are an example defining niceness factor for the exemplary tool and regions of FIG. 5B, it being assumed that regions I–VII of this tool have non-cutting surfaces and that the surfaces of regions VIII and I. 0
II. 0
III. 0
IV. 0
V. 0
VI. 0
VII. 0
VIII. $2(x^2+y^2)$
IX. $2(x^2+y^2)+(z-19)^2$ IX are cutting surfaces:

Referring to equations 6, it is seen that the niceness function is 0 for regions I–VII which have non-cutting surfaces. The niceness function for region VIII is always 2 at the surface of the tool and 0 at the tool axis. Region IX has a slightly more complicated niceness function. Since it is less desirable to cut with the center of the tip of the tool (the velocity of the tip center is 0), higher niceness value is given to portions of the region that are further from the tool axis. In region IX, surface point (0, 1, 19) has a niceness of 2, while surface point (0, 0, 20) has a niceness of 1. As for region VIII, niceness decreases as penetration depth increases.

As will be discussed in greater detail later, niceness value can be used to distinguish both between valid contacts and invalid contacts as indicated above and to distinguish between multiple valid contact postures that contact the same area of part 12 or body 14. In the event of multiple valid contacts in the same part area, the system can either record only the posture with the better niceness value, or record all acceptable postures, the former being the currently preferred technique.

In addition to being used as indicated above to facilitate selection of acceptable postures in a CAD/CAM application, niceness factor may be used in other ways. For example, when a contact is detected for a region having zero niceness factor, this might be used to trigger an audio response from output 30, a vibratory response to the user through the haptic interface 32 or an appropriate display on monitor 28 to alert the user that an inappropriate collision has occurred. The force response in areas having low niceness factors may also be greater than that in areas having higher niceness factors, the response for example being k(depth) in high niceness regions and k(depth)² in regions having for example a zero niceness factor. The force response for a given point may also be made to vary inversely with the niceness factor for a given region, this being another factor in determining the overall force response applied to the haptic feedback device for a given posture.

Referring to FIG. 1, it is seen that tool 10 in removing a given layer 18 can make contact with either part 12, body 14 or, for a limited number of points, both. In accordance with the illustrative embodiment of the invention, the methodology used for determining postures is somewhat different depending on whether contact is to be made with the part or the body. Thus, while for analyzing postures for part 12, where the shape of the tool is relatively simple so as to be easily representable in equation form, while the shape of the body is far more complex and is more easily represented in a triangulated or point cloud form, each layer 18 of body 14 is essentially a plane which can be easily represented as an equation, while the tool can be just as easily represented in triangulated or point cloud form. Further, representing at least one of the colliding solid components as an implicit equation is useful in that, like solids, implicit equations divide space into two subsets, a set where f(x, y, z)>0 and a set where f(x, y, z)<0. This division naturally corresponds to the interior and exterior of the solid. Therefore, determining whether a given coordinate (x, y, z) is within the solid (i.e., determining whether a point of the point cloud is within the tool) is as simple as evaluating the function f(x, y, z). Boundary points are those for which f(x, y, z)=0. Similarly, by representing the bottom plane of a layer 18 as an implicit equation and representing tool 10 as a point cloud, penetration by the tool through this plane may also be easily determined. Thus, for each area which needs to be looked at, the representation for the tool and for the body/part is done in a way which results in the collision computations being done as simply as possible.

Thus, referring to FIG. 3, during step 50, a point cloud representation is also stored in memory 26 for tool 10 and a BV hierarchy is created for this representation. During step 52, equations are created and stored for the constraints or planes of the layers 18 of body 14, and these are also stored in memory 26. During step 53, various optional guides to be discussed in greater detail later, may also be stored, these including, but not being limited to constraint guides, snap guides, orientation guides, etc. While steps, 40, 42, 50, 52 and 53 have been shown as being performed in that order in FIG. 3, these steps may in fact be performed in any order, the order shown in FIG. 3 being merely for convenience of illustration.

While in the discussion above it has been assumed that the user will generate the equations, triangulated representation and/or point cloud for the tool, the body and/or the part, in practice the tool manufacturer may provide such representations for the tool which can be loaded directly into memory 26, and such representations may also be available for certain standard bodies 14 and/or certain standard parts 12. The triangulated or point cloud representation of the part may also be generated from scanning a solid model of the part or from a 3D scan of a real or simulated point.

Once the preliminary steps indicated above have been completed, the system is ready to be used to generate a posture map. Referring again to FIG. 3, it is seen that the first step in generating the posture map, once all necessary information has been stored, is to use the device of haptic interface 32 to simulate movement of tool 10 relative to body 14, including part 12 embedded therein, the haptic interface reading tool position and orientation resulting from such movement (step 54). The movements are carried out in virtual space, for example on some surface or in space. The sensors will result in these movements of the haptic interface device being inputted to processor 20 which causes the position of the tool relative to that of body 14 for the simulation to be displayed on monitor 28. The user may coordinate his movements through use of the display to bring the tool into contact with body 14 at a desired point.

While from FIG. 1 it is seen that generally for a given point in its travel path, the tool is either contacting only a constraint or surface of a layer 18 of body 14, or is contacting a surface on part 12, contacting both only at the junctions between the part and the body, the algorithm for the preferred embodiment test for contact with both part 12 and the constraint layer of body 14 during each cycle of the system, which cycles for a preferred embodiment are performed at roughly 1000 Hz. Thus, during each cycle an interference detection is performed between tool 10 in binary space partition form and part 12 in point cloud form (step 56).

Since collisions are possible on any surface of tool 10, a complete collision analysis would require a check of each point of the point cloud for inclusion within the tool object interior. To achieve this, the point is compared to a series of boundary equations as previously discussed to determine whether or not the point is in the tool interior or outside the tool and, if the point is in the interior, which region of the tool the point has penetrated and its location. Having determined the region in which the point resides and the point, the corresponding force response functions are evaluated for the given point.

However, this point by point comparison is very slow, and cannot give anything approaching a real-time response. Therefore, a bounding volume hierarchy, a technique known in the art, is utilized to increase the efficiency over checking each point individually. A bounding volume hierarchy, for example divides the part in half (the hierarchy for such divisions having been stored during step 40) and determines if there is a contact in either half. If there is a contact in only one of the halves, this half is divided again and the process repeated. If there are contacts in both halves, both halves are divided in two and the process repeated. For each comparison, halves for which there is no contact are discarded and halves in which there is contact are further divided to isolate the contact point or points. The ultimate divisions are down to a small set of points. Algorithms for performing such bounding volume hierarchy are available in the art.

Each identified contact point for a given posture will permit a force magnitude and direction to be determined using for example equations 4 and 5 previously stored for the regions in which contact occurs (step 58). These forces are summed and then averaged during step 60.

Once these steps have been completed, the operation proceeds to step 62 to detect collisions between tool 10 and the constraint surface for the layer 18 being operated on at that time. Since a point on a triangle or point cloud represented tool with a plane represented by an equation is easy to detect, all points on the tool need not be represented. For example, referring to FIG. 5B, points might be required only for regions VIII and IX for layer 18A; however, for certain deeper layers 18 where spurious collisions with points on part 12 may occur, this may not be the case. In these collisions, the direction of force response is always normal to the plane and the depth is also easily calculated based on whether points of tool 10 are detected as being positive or negative with respect to the equation representation of the layer plane.

To the extent a collision is detected during step 62, a force response is determined for this collision and this force response is added to the force response determined during step 60. Thus resultant force will be only the force at the constraint plane where contact is only being made with the plane and will only be the force generated at the surface of part 12 where the tool is contacting only the part. For points at the junction of both the body and the part, the resultant force will be the average force produced as a result of both contacts.

For each profile, the niceness factor for the tool region in which contact occurs are also determined and the lowest of these niceness factors utilized to determine the acceptability of each posture detected (step 66). Any posture which has a non-zero niceness factor is a potential posture for a given point on part 12 or body 14. As indicated previously, a zero niceness factor would occur where contact is made for the given posture with a portion of body 14, or more likely part 12, which is not a cutting surface of the tool.

During step 68, the posture is recorded if it is an acceptable posture. As previously indicated, posture is a composite of x-y-z position of the tool and the orientation of the tool. Orientation is recorded as a unit vector pointing in the direction of the axis of symmetry 16 of the tool. During this step, all postures having a non-zero niceness factor may be recorded or processor 20 may perform some screening on the postures before recording them. For example, a posture for a give point or a triangle on a surface of for example part 12 may be recorded only if it has a higher niceness factor than a posture already recorded for such point or triangle. Alternatively, a posture may be recorded only if it has a niceness factor exceeding some predetermined threshold. Other criteria may also be utilized. The postures recorded during step 68 for a posture map which may either be utilized as recorded or may be subsequently processed to determine optimum postures for the tool to be used for example for generating tool paths. The posture map may also include for each posture an indication of the point and/or triangle contacted. In some instances, it may be necessary to use different tools to reach different portions of the body or part or to machine different portions of the body or part in different ways. Where this is done, representations for all tools used would be stored during steps 42 and 50 and the representation for the appropriate tool would be utilized during steps 54–64 for the layer 18 or points on part 12 being operated on.

From step 68, the process proceeds to step 70 to send an appropriate force response to the haptic device of haptic interface 32 so as to cue the user or operator to move or orient the tool in a desired manner in one or more of the available degrees of freedom. From step 70, the operation returns to step 54 to begin another cycle of operation.

Several features may be added to the invention to enhance its utility in generating a posture map or in performing other applications. The first of these additional features is referred to as "snap guides" and is an extension of the constraint guides previously discussed which establish a plane within, for example body 14, at which a machining operation is to be performed (i.e. the bottom plane of a layer 18 so that the layer 18 may be removed during the operation). The snap guides encourage the tool 10 to touch the constraint guide or plane without violating it. Since the constraint guide alone resists the tool penetrating the constraint/plane, and the snap guide, as will be seen, influences the tool to touch the constraint, these two factors influence the tool's position in opposite directions, facilitating positioning of the tool so that it undergoes no force from either the constraint or the snap guide when the tool touches the constraint with zero penetration.

The snap guide is designed so that it is only effective when the cutting surface of the tool is within some predetermined distance from the constraint, which distance is relatively small. When the tool is further away from the constraint, the guide has no effect on the tool; when the tool is within the snap guide zone, a force is added to the cumulative force determined during step 64, and applied to the haptic interface during step 70, which force is in a direction to influence the tool to touch the constraint plane. As previously discussed, if the tool is penetrating the constraint plane, the constraint results in a force being generated to influence the tool out of the constraint area. Mathematically, assuming the constraint plane is an x-y plane, and that z is zero at the surface of the constraint plane, the constraint guide imposes a force on the tool in the positive z direction when the z coordinate of a point on the tool is negative. Conversely, if the tool has no point with a z coordinate which is zero or negative, and the tool has a point on a working surface with a positive z coordinate within a selected range, a force in the negative z direction will be applied to the tool to compel the tool into contact with the constraint plane. There will be no force applied to the tool if a z coordinate for a point on the tool is zero and there is no point on the tool with a z coordinate which is negative. Stated another way, assuming the constraint guide were defined only within one unit of the constraint plane (i.e. z=1), any point whose z coordinate was greater than 1 would have no influence on the force applied to the haptic device, a point with a z coordinate less than 1 but greater than 0 would result in a negative z force being applied to the haptic device, and any point with a z coordinate less than 0 would result in a positive z force being applied to the haptic device. These snap guide forces would be summed with the other forces previously discussed during step 64 in determining an overall force response on the tool.

Figure 5C:
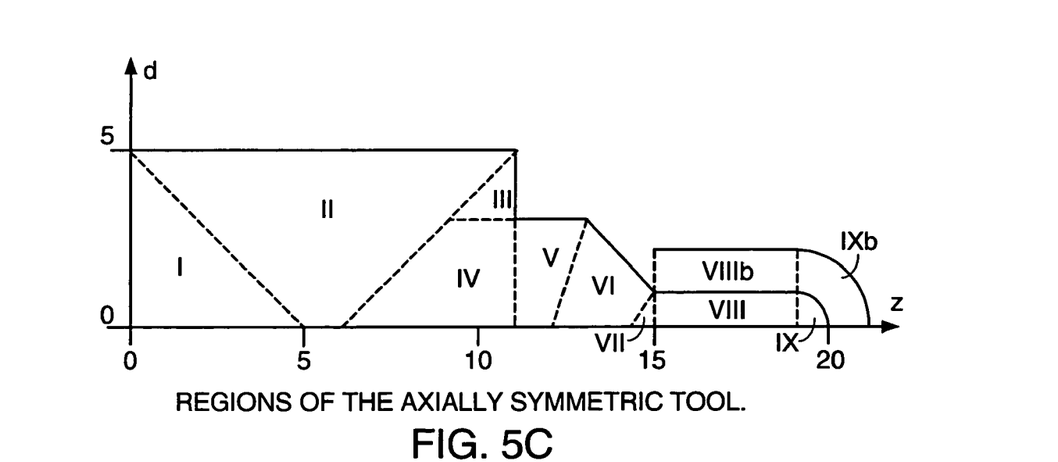

The second related additional feature is a part surface snap guide. The part surface snap guide extends the snap guide concept to the equations that describe the surface of tool 10. These snap guides can be thought of as additional regions that serve substantially the same purpose as the constraint snap guides described above. For example, referring to FIG. 5C, additional regions VIIIb and IXb are added to previously described regions I through IX of FIG. 5B. The direction of force response for region VIIb is exactly opposite to that of region VIII. In other words, region VIII influences the penetration points out of the tool solid, while region VIIb influences the points toward the tool. The same is true for regions IX and IXb. The implementation of the opposite directions between VIII and VIIIb can be handled by the magnitude of the force response. Thus, the direction of force response is the same for these two regions; however, the magnitude of the force response is positive in section VIII and negative in section VIIIb. This magnitude function can be handled by a $$\text{depth} = 1 - \sqrt{x^2 + y^2}$$

single equation:

In this equation, the depth is positive when $\sqrt{x^2+y^2}$ is less than one (i.e. the point is in region VIII) and is negative when the $\sqrt{x^2+y^2}$ is greater than one (the point is in region VIIIb). Again, as with the constraint snap guide forces, the part snap guide forces discussed above are summed with all of the other forces generated for a given point during step 64 to determine the force response applied to the haptic interface for the given posture and to determine what is stored for the posture.

Figure 6:
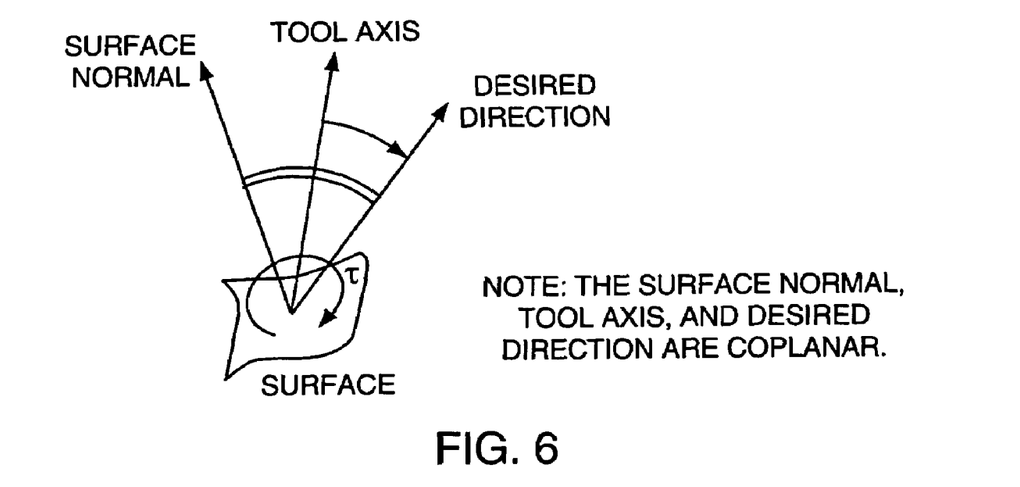
FIG. 6 is a diagram illustrating parameters for performing an orientation snap function.

A final additional feature may be referred to as orientation snap. As previously indicated, there is generally a preferred angle for the tool 10 to contact a surface of part 12 or body 14. To facilitate achieving this desired contact angle, the direction of the tool axis 16 is compared to the surface normal of each of the contacted points, there being an outward normal associated with each point of the point cloud. By taking the average of all of these normals, a composite surface normal is determined. The angle between the composite surface normal and the tool can be determined by comparing their respective directions and, based on this comparison, a torque T can be generated to compel the tool to contact the surface at the desired angle. This torque is applied by processor 20 to the haptic interface 32. The direction of desired rotation is determined by the plane containing the surface normal and the tool axis. As illustrated in FIG. 6, the direction of the torque $\tau$ is the cross-product of the unit surface normal and the tool axis direction. The magnitude of the torque is proportional to the angle between the surface normal and the desired angle. If $(n_x, n_y, n_z)$ is the unit surface normal, $(a_x, a_y, a_z)$ is the unit tool axis direction, and $\beta$ is the desired angle, then the cross-product $(n_x, n_y, n_z) \times (a_x, a_y, a_z)$ is the direction of the torque. The inverse cosine of the dot product is the angle between the surface normal and the tool axis (i.e. $A = \cos^{-1}[(n_x, n_y, n_z) \cdot (a_x, a_y, a_z)]$). The magnitude of the torque is proportional to the difference between the desired angle and A. Orientation snap should only be used when contact is on a cutting surface (i.e., a surface for which niceness factor is greater than zero.)

While in the discussion above, the method and apparatus have been utilized for generating a posture map, it is apparent that the haptic interface techniques of this invention may be utilized in a great variety of virtual reality applications where for example various activities are being simulated for training, recreational or other purposes. For example, doctors frequently now perform medical procedures without actually viewing the body components on which they are operating, but see these components only through a video monitor and rely on such vision and tactile feedback to properly perform the procedure. The teachings of this invention could thus be used to provide realistic training for doctors in performing such procedures. The speed at which the system can operate, for example 1000 Hz sampling rate for the haptic interface sensors, facilitates real-time simulations in such applications.

There are some things which can be done in the system described above which can enhance realism where the system is for example being used for training purposes. For example, when a doctor touches a body part with an instrument, for example with a scalpel, depending on the applied force and the way the force is applied, for example the rate of movement of the instrument at the time of contact or the point on the instrument at which contact is achieved, the body part may move or deform slightly in response to the applied force. Such a reaction can be simulated during, for example steps 58 and 60 where the applied force can be detected and allocated between a force applied back to the instrument controlled by the haptic interface device and a response to the force at the body part (i.e. movement or deformation). The force response to the haptic interface may thus be reduced, may be eliminated or may even become a negative force if for example the body part were to move at a faster rate than the instrument in response to the force applied thereto. Such a feedback capability can facilitate the doctor being trained to make contact with the proper feel and angle.

Similarly, in some instances, the body part or other object being operated on by the tool may have a skin or shell which requires a threshold force applied thereto in order to pierce the skin or shell, but requires substantially less force for continued movement of the tool once the skin or shell has been pierced. When the skin deforms before puncture, this can be simulated in the manner indicated above. The net force applied to the skin or shell can also be detected by suitable sensors, and once this occurs, puncture can be simulated by a rapid reduction in the force applied to the haptic interface. Other similar effects encountered in various applications for the system may also be simulated by detecting position, forces, acceleration, or other parameters with suitable sensors at the haptic interface or elsewhere and using these parameters in the simulation.

While having both the tool and the part being movable under user control dramatically increases the complexity of the system, in certain applications user controlled movements of the part may be permitted to for example simulate presenting a different face of the part to a tool or for other appropriate simulations, depending on application.

Thus, while the invention has been described above with respect to a preferred application and illustrative systems, tools and bodies/parts have been utilized for purposes of the description, all of the above are for purposes of illustration only and the foregoing and other changes in form and detail may be made in both the method and apparatus by one skilled in the art while still remaining within the spirit and scope of the invention which is to be defined only by the appended claims.

What is claimed is:

1. A method for generating CAD/CAM postures for a tool operating on a body including:
   storing a representation of the tool and a representation of said body in a computer;
   using a user controlled haptic interface device to control simulated movement of the tool relative to the body;
   detecting any collision between the tool and the body for a given posture, including the position on each for each collision, the direction of the collision, and the penetration of the tool into the body;
   converting the detected direction, point and penetration for each collision into at least one force vector on the tool;
   summing the force vectors for a given posture;
   applying said at least one force vector as a corresponding feedback force vector to said interface device, and thus to the user; and
   storing a plurality of CAD/CAM postures of the tool to form a posture map, each of the plurality of postures indicating where the tool collides with the body at a working surface of the tool, but does not otherwise collide with the tool, the plurality of postures stored in the posture map subsequently referenceable to determine, at least in part, a force-feedback vector, wherein only CAD/CAM postures which at least meet selected criteria are stored.

2. A method as claimed in claim 1 wherein only the best posture for each point on the body is stored.

3. A method as claimed in claim 1 wherein said tool representation is divided into regions, a different region being defined at least at each surface transition of the tool, force direction and magnitude being continuous with each said region.

4. A method as claimed in claim 3 including defining a snap-fit region for said tool around each working surface wherein contact with the second body is desired.

5. A method as claimed in claim 4 including applying a force to said interface device to urge said tool toward the body when the body and tool are not in contact but the body is in a said snap-fit region of said tool.

6. A method as claimed in claim 3 including storing a binary space partition tree representation of the tool for each said region.

7. A method as claimed in claim 6 including storing a point cloud representation of the body.

8. A method as claimed in claim 1 wherein a part is being machined from the body and material is being removed from the body in layers, including establishing constraints at a layer boundaries, and detecting collisions between the tool and a selected operative constraint.

9. A method as claimed in claim 8 including storing implicit equation representations of said constraints and point cloud representation of said tool.

10. A method as claimed in claim 1 including defining a desired orientation for said tool, and applying a suitable force to said haptic device to urge the device in a direction to correct any deviation of tool orientation from said desired orientation.

11. A method for generating CAD/CAM postures for a tool operating on a body including:
   storing a representation of the tool including at least one niceness factor, the at least one niceness factor being higher for regions of the tool where contact is desired, and decreasing for regions as a function of desired contact in such regions, and a representation of said body in a computer;
   using a user controlled haptic interface device to control simulated movement of the tool relative to the body;
   detecting any collision between the tool and the body for a given posture, including the position on each for each collision, the direction of the collision, and the penetration of the tool into the body;
   converting the detected direction, point and penetration for each collision into at least one force vector on the tool;
   summing the force vectors for a given posture;
   applying said at least one force vector as a corresponding feedback force vector to said interface device, and thus to the user; and
   storing a plurality of postures of the tool to form a posture map, each of the plurality of postures indicating where the tool collides with the body at a working surface of the tool, but does not otherwise collide with the tool, the plurality of postures stored in the posture map subsequently referenceable to determine, at least in part, a force-feedback vector.

12. A method as claimed in claim 11 wherein the at least one niceness factor is zero for regions where contact is undesirable.

13. A method as claimed in claim 11 wherein the at least one niceness factor for a posture is the lowest niceness factor for contacts occurring at such posture.

14. A method as claimed in claim 11 wherein said tool representation is divided into regions, a different region being defined at least at each surface transition of the tool, and wherein a niceness factor is assigned to each region.

15. A method for generating CAD/CAM postures for a tool operating on a body including:
   storing a representation of the tool and a representation of said body in a computer;
   using a user controlled haptic interface device to control simulated movement of the tool relative to the body;
   detecting any collision between the tool and the body for a given posture, including the position on each for each collision, the direction of the collision, and the penetration of the tool into the body, wherein a part is being machined from the body and material is being removed from the body in layers, including establishing operative constraints at layer boundaries, and detecting collisions between the tool and a selected operative constraint;
   converting the detected direction, point and penetration for each collision into at least one force vector on the tool;
   summing the force vectors for a given posture;
   applying said at least one force vector as a corresponding feedback force vector to said interface device, and thus to the user; and
   storing a plurality of CAD/CAM postures of the tool to form a posture map, each of the plurality of postures indicating where the tool collides with the body at a working surface of the tool, but does not otherwise collide with the tool, the plurality of postures stored in the posture map subsequently referenceable to determine, at least in part, a force-feedback vector, wherein collisions are detected between the tool and the part as well as between the tool and the operative constraints, wherein force vectors are generated for each collision, and wherein said summing step sums and averages force vectors for all collisions.

16. A system for controlling the simulated interfacing of a first body controlled by a user with a second body, while providing haptic feedback to the user on such interface including:
   at least one memory storing selected representations of said first body and of said second body, and a representation for a guide zone around at least a portion of one of said bodies, the representation for one of said bodies including an implicit representation and a binary space partition tree and the representation for the other body being a discrete representation;
   a user controlled haptic interface device; and
   processing apparatus responsive to said interface device for providing simulated movement of the first body relative to the second body, said processing apparatus detecting collisions between the bodies resulting from such simulated movement, including the position on each body of each collision, the direction of the collision, and force for the collision, converting the detected direction, point and force for each collision into at least one force vector, modifying the at least one force vector based on at least one of a plurality of postures stored in a posture map and, feeding back the at least one force vector through said interface device, wherein said processing device provides a force feedback to said interface device to urge the first body toward the second body when the bodies are not in contact but the guide zone of the one body is detected as having the other body therein.

17. A system as claimed in claim 16 wherein said interface device controls simulated movement of said first body in at least five degrees of freedom; and
   wherein said at least one force vector is in the same at least five degrees of freedom.

18. A system as claimed in claim 16, wherein force for a collision is represented at least in part by penetration of the body represented by the implicit representation into the other body.

19. A system as claimed in claim 16 wherein at least one of said representations is stored as a point cloud representation of the body.

20. A system as claimed in claim 16 including a niceness factor stored in said at least one memory for at least one feature of said first body;
   said processing apparatus utilizing the niceness factor to influence said force vector.

21. A method of providing haptic feedback corresponding to full-body contact between a first object controlled by an interface device and at least one second object, the method comprising acts of:

storing a first three dimensional representation and a second three dimensional representation of the first object and the at least one second objects, respectively, wherein one of the representations includes at least one region defined by a implicit equation and the other representation includes a point cloud and a bounding volume hierarchy;

determining presence or absence of penetration of the first and second representations at each point in the point cloud, including traversing the bounding volume hierarchy, each successive determination of a presence or an absence of a penetration involving portions of the bounding volume for which the presence of a penetration was determined;

wherein in an event of the presence of penetration of the first and second representations, performing acts of:

computing a vector having a magnitude related to depth of the penetration and a direction related to direction of penetration of each penetration;

computing at least one force vector corresponding to the full-body contact between the first and second object based on at least one of the penetration vectors;

wherein in an event of the absence of penetration of the first and second representations, performing an act of:

computing at least one force vector based on a relationship between the first object and at least one guide zone.

22. The method of claim 21, wherein a binary space partition tree is associated with the implicit equation representation and wherein the act of determining a presence or an absence of a penetration includes traversing the binary space partition tree.

23. The method of claim 22, wherein determining a presence or an absence of a penetration includes intersecting iteratively refined portions of the binary space partition tree and the boundary volume hierarchy.

24. The method of claim 21, wherein at least some of the points in the point cloud representation are vertices in a triangulated surface.

25. A method of providing haptic feedback corresponding to full-body contact between a first object controlled by an interface device and at least one second object, the method comprising acts of:

storing a first three dimensional representation and a second three dimensional representation of the first object and the at least one second objects, respectively, wherein one of the representations includes at least one region defined by a implicit equation and the other representation includes a point cloud and a bounding volume hierarchy, and wherein the first three dimensional representation is of the first object and the at least one region includes a plurality of regions defined by a plurality of implicit equations, at least one region having associated with it a niceness factor related to the desirability of contact between the at least one region and the second object;

determining presence or absence of penetration of the first and second representations at each point in the point cloud;

wherein in an event of the presence of penetration of the first and second representations, performing acts of:

computing a vector having a magnitude related to depth of the penetration and a direction related to direction of penetration of each penetration;

computing at least one force vector corresponding to the full-body contact between the first and second object based on at least one of the penetration vectors;

wherein in an event of the absence of penetration of the first and second representations, performing an act of:

computing at least one force vector based on a relationship between the first object and at least one guide zone.

26. A method of providing haptic feedback corresponding to full-body contact between a first object controlled by an interface device and at least one second object, the method comprising acts of:

storing a first three dimensional representation and a second three dimensional representation of the first object and the at least one second objects, respectively, wherein one of the representations includes at least one region defined by a implicit equation and the other representation includes a point cloud and a bounding volume hierarchy, and wherein the first three dimensional representation is of the first object and the at least one region includes a plurality of regions defined by a plurality of implicit equations, and wherein at least one region has associated with it a snap-fit region to urge the first object in a direction to bring the at least one region in contact with the second object when the second object is within the snap-fit region;

determining presence or absence of penetration of the first and second representations at each point in the point cloud;

wherein in an event of the presence of penetration of the first and second representations, performing acts of:

computing a vector having a magnitude related to depth of the penetration and a direction related to direction of penetration of each penetration;

computing at least one force vector corresponding to the full-body contact between the first and second object based on at least one of the penetration vectors;

wherein in an event of the absence of penetration of the first and second representations, performing an act of:

computing at least one force vector based on a relationship between the first object and at least one guide zone.

27. A method of providing haptic feedback corresponding to full-body contact between a first object controlled by an interface device and at least one second object, the method comprising acts of:

storing a first three dimensional representation and a second three dimensional representation of the first object and the at least one second objects, respectively, wherein one of the representations includes at least one region defined by a implicit equation and the other representation includes a point cloud and a bounding volume hierarchy, and wherein the second three dimensional representation is of the at least one second object and wherein the at least one guide zone is associated with the second three dimensional representation and includes a snap-fit region to urge the first object in a direction to bring the first object in contact with the second object when the first object is within the snap-fit region;

determining presence or absence of penetration of the first and second representations at each point in the point cloud;

wherein in an event of the presence of penetration of the first and second representations, performing acts of:

computing a vector having a magnitude related to depth of the penetration and a direction related to direction of penetration of each penetration;

computing at least one force vector corresponding to the full-body contact between the first and second object based on at least one of the penetration vectors;

wherein in an event of the absence of penetration of the first and second representations, performing an act of:

computing at least one force vector based on a relationship between the first object and at least one guide zone.

28. In a virtual three-dimensional environment including a haptic interface device to control a simulated movement of at least one first object with at least five degrees of freedom with respect to at least one static object the at least one first object represented by one or more geometric regions, a method of generating a posture map of the at least one first object, the method comprising acts of:

selectively storing a plurality of postures of the at least one first object at least at points at which the at least one first object has a posture wherein a portion of at least one geometric region penetrates the at least one static object; and determining whether to store any give posture of the at least one first object based on at least one of a niceness factor associated with the one or more geometric regions penetrating the at least one static object, and a depth of the penetration of the one or more geometric regions, wherein determining the posture being stored includes choosing the posture having the highest niceness factor associated with the one or more penetrating regions.

29. In a virtual three-dimensional environment including a haptic interface device to control a simulated movement of at least one first object with at least five degrees of freedom with respect to at least one static object, the at least one first object represented by one or more geometric regions, a method of generating a posture map of the at least one first object, the method comprising acts of:

selectively storing a plurality of postures of the at least one first object at least at points at which the at least one first object has a posture wherein a portion of at least one geometric region penetrates the at least one static object; and determining whether to store any give posture of the at least one first object based on at least one of a niceness factor associated with the one or more geometric regions penetrating the at least one static object, and a depth of the penetration of the one or more geometric regions, wherein determining the posture being stored includes an act of choosing a posture only when a niceness factor associated with the one or more penetrating regions exceeds a predetermined threshold.

30. In a virtual three-dimensional environment including a haptic interface device to control a simulated movement of at least one first object with at least five degrees of freedom with respect to at least one static object, the at least one first object represented by one or more geometric regions, a method of generating a posture map of the at least one first object, the method comprising acts of:

selectively storing a plurality of postures of the at least one first object at least at points at which the at least one first object has a posture wherein a portion of at least one geometric region penetrates the at least one static object; and determining whether to store any give posture of the at least one first object based on at least one of a niceness factor associated with the one or more geometric regions penetrating the at least one static object, and a depth of the penetration of the one or more geometric regions, wherein determining the posture being stored includes an act of determining the posture being stored based on a niceness factor associated with the one or more regions penetrating the at least one static object, and a depth of the penetration of the one or more regions.

31. A posture map for generating guide paths for at least one first object, the posture map comprising:

a plurality of postures, each of the plurality of postures associated with a point in a virtual three-dimensional cartesian space where at least one portion of a first representation of the at least one first object in the three-dimensional space penetrates a representation of at least one second object in the three-dimensional space, and representing a desirable posture for the at least one first object at the associated point, each of the plurality of postures including:

a first, a second, and a third location component representing a reference coordinate location of the at least one first object with respect to a first, a second, and a third axis of the cartesian space, respectively; and a first and a second rotation angle representing a rotation of the at least one first object about the first and second axis, respectively, wherein the first representation is divided into a plurality of regions, each of the plurality of regions having associated with it a niceness factor indicating the desirability of penetration between the region and the at least one second object.

32. The posture map of claim 31, wherein the posture at each point in the set of three-dimensional points corresponds to a desired posture of the at least one first object and wherein the posture is chosen based on at least one of a niceness factor associated with at least one penetrating region, and a depth of the penetration of the at least one penetrating region.

33. The posture map of claim 31, wherein the posture at each point in the set of three-dimensional points is chosen based on the niceness factor associated with the at least one penetrating region, and a depth of the penetration of the at least one penetrating region.

* * * * *

UNITED STATES PATENT AND TRADEMARK OFFICE
CERTIFICATE OF CORRECTION

PATENT NO. : 7,084,867 B1 Page 1 of 1
APPLICATION NO. : 09/542942
DATED : August 1, 2006
INVENTOR(S) : Stephen S. Ho et al.

It is certified that error appears in the above-identified patent and that said Letters Patent is hereby corrected as shown below:

In the Specification:

In column 1, line 50, please replace "realsolid" with -- real solid --;
In column 4, line 13, please replace "=apparent" with -- apparent --;
In column 14, line 36, please replace "VIIb" with -- VIIIb -- ;
In column 14, line 39, please replace "VIIb" with -- VIIIb -- .

In the Claims:

Col. 21,
In claim 28, line 21, please replace "object" with -- object, -- .

Signed and Sealed this

Thirtieth Day of January, 2007

JON W. DUDAS
*Director of the United States Patent and Trademark Office*